Oct. 17, 1967     J. M. VAN VLEET     3,347,114

METHOD OF MAKING TAPS

Original Filed April 27, 1962

INVENTOR
JOHN M. VAN VLEET

BY Wheeler, Wheeler & Wheeler
ATTORNEYS 3,347,114
METHOD OF MAKING TAPS
John M. Van Vleet, Hartland, Wis., assignor to Balax, Inc., North Lake, Wis., a corporation of Wisconsin
Continuation of abandoned application Ser. No. 490,340, Sept. 27, 1965, which is a division of application Ser. No. 190,609, Apr. 27, 1962, now Patent No. 3,220,032, dated Nov. 30, 1965. This application Aug. 24, 1966, Ser. No. 575,227
3 Claims. (Cl. 76—101)

This invention relates to a method of making taps.

The present application is a continuation of my application 490,340, filed Sept. 27, 1965, now abandoned, and which in turn is a division of application 190,609, filed Apr. 27, 1962, entitled, "Thread Cutting Tap," now Patent No. 3,220,032, issued Nov. 30, 1965.

In the preferred embodiment herein disclosed, the lead profile is an arc of large radius but any appropriate curved or straight outline is readily produced. The lead is produced in a manner such that the effect is to offset successive teeth bodily in a radial direction. This is in contrast with conventional practice wherein the several teeth have their roots at like radii, their tips being ground off to develop the lead.

A particular feature of the present method invention is the formation of the teeth of the lead section of the tap on an interrupted spiral on a helical path, the relative movement of the forming tool and the blank in a relative radially outward direction being interrupted at the commencement of each tooth so that the forming of the crest of the tooth will continue in a radially constant or inward direction until the tooth is completed, whereupon the radially outward movement of the tool with respect to the blank is resumed to return the tool to the predetermined spiral helical path by the time the formation of the next tooth commences.

It is found that a tap made in accordance with the present invention not only cuts threads more accurately than any previously known tap, but is effective with greatly increased tap life.

Figures 1, 2:
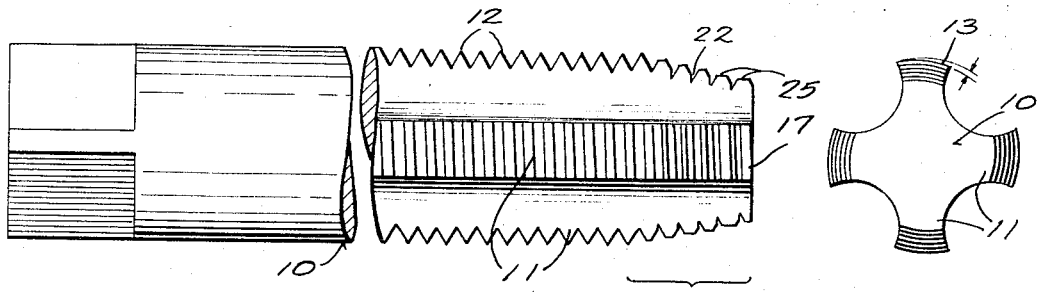
FIG. 1 is a fragmentary plan view of a tap embodying the invention.
FIG. 2 is a view in end elevation of the tap shown in FIG. 1.

Fluted body portion 10 (FIGS. 1 and 2) is provided with lands 11 each of which is provided with a row of thread cutting teeth 12.

The over-all diameter of the teeth in the lead portion 15 of the tap conventionally increases progressively from the entering end 17 thereof. However, in the prior art the increase in radius involved the tooth crests only, whereas in the preferred construction of the present tap, as disclosed in the parent application above identified, the teeth are bodily offset radially outwardly. While the crests of the teeth may be slightly broader at the entering end, as shown at 25 in FIG. 1 the change in over-all radius does not depend merely on the cutting away the crest as it does in conventional taps.

It is broadly immaterial to the present invention whether the progressive increase in over-all diameter of the teeth in the lead portion 15 of the tap is effected rectilinearly but it is preferred that the axial profile be on a curve. In FIG. 1, the profile is axially curved in accordance with preferred practice. Either type is readily generated in accordance with the present invention.

Figure 4:
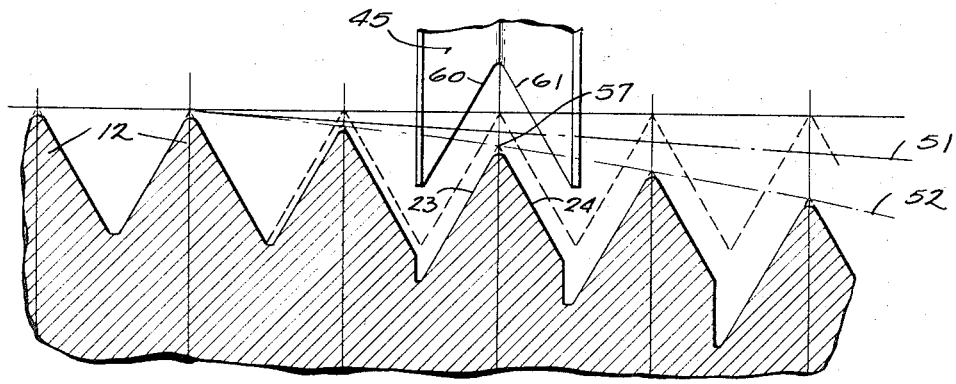
FIG. 4 is a fragmentary diagrammatic view showing a step in a method of manufacturing a tap according to the present invention.

All the teeth 12 are of like radius both at their theoretical tips and at their theoretical roots. In the lead section, as shown in FIG. 4 toward the entering end 17 of the tap, the successive cutting teeth along the lands 11 are bodily displaced in radius toward the axis of the tap so that not only their theoretical crests are at progressively reduced radii but their theoretical roots are also at progressively reduced radii, the grooves or valleys 22 between successive teeth being cut more deeply into the land portion 11 of the tap.

The teeth of my improved tap may be cut with any appropriate forming tools such as milling tools or abrasive tools. By way of example, I may use a female cutter or wheel having such a cross section as that shown in FIG. 4 where the tool illustrated is an abrasive wheel 45 peripherally grooved to provide opposed faces 60 and 61 for forming the flanks 23 and 24 of the respective lead teeth of the tap. The relative movement between the tool 45 and the workpiece from which the tap is being machined will be both helical and radial. The helical movement will preferably be at uniform pitch and will correspond to the pitch of the cutting teeth of the tap.

Figure 3:
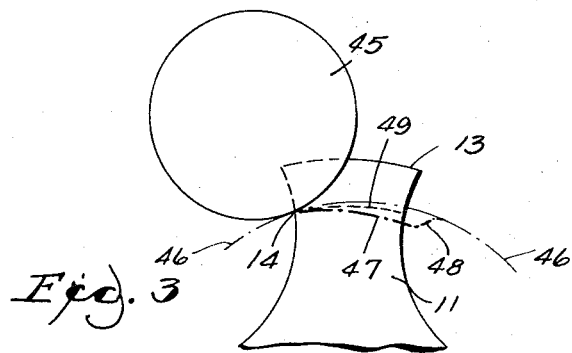
FIG. 3 is a diagrammatic view showing the operation of a forming tool on one flute of a tap in course of construction.

The radial movement will represent an interrupted spiral as shown diagrammatically in FIG. 3. In FIG. 3, only the relative radial movement between the cutting tool 45 and the land 11 can be illustrated. Since the wheel is cutting a tooth on the lead portion of the tap, which has an axial taper, the wheel must not only move helically according to the pitch of the desired teeth, but it must move radially so that the work-entering ends 14 of the crests of successive teeth will be at progressively increasing radius. However, if the relative movement of the tool were merely a helically spiral movement respecting the workpiece, the teeth would not function properly because they would have increasing radius or negative clearance angle, or at least uniform radius, rather than clearance following their respective leading edges. It is desirable that behind its leading end 14 the form of each tooth shall either be of progressively decreasing radius as shown at 13 in FIG. 2, for clearance purposes, or at least shall have no increase in radius.

Accordingly, instead of having the tool 45 progress on the helically spiral line indicated at 46 in FIG. 3, the radially outward movement of the tool with respect to the work is arrested at the crest peak at which the tool is shown representing the point at which a given land has metal removed in a given tooth-forming pass. Thereupon the tool has slight radially inward movement on the path designated at 47 to form the crest 13 in such a way as to provide clearance (if desired) behind the leading end 14 thereof. Upon clearing the given land (or prior to reaching the next land) the tool moves sharply radially outwardly as indicated by the step 48 and engages the successive land on the original spiral helical path 46.

For reference, a dotted line 49 has been included in FIG. 3 to show a fixed radius circle about the axis of the tool.

The relative radial movement will always be on the pitch radius of the helix of the particular tooth which is being cut and the depth of penetration in one or more passes will be whatever depth is required to locate the theoretical apex 57 upon the selected profile 51 or 52 whether this be rectilinear or curved.

I claim:

1. A single step method of making a cutting tap having lands and a lead section wherein teeth on such lands are on constant helical pitch in an interrupted spiral path, said method comprising establishing a spiral path irrespective of profile producing relative rotation between a tap blank and a tool for forming teeth thereon, producing relative axial movement between the blank and the tool on constant pitch, producing relative radial movement between the blank and tool in an outward direction between lands, engaging the tool with each land on said spiral path to initiate tooth-forming removal of metal, and discontinuing such relative outward radial movement during the tooth-forming removal of metal from each individual land while traversing said tool clear across the land.

2. A method according to claim 1 in which the relative radial movement between the tool and the blank is reversed during the tooth-forming removal of metal from each individual land, the tool moving progressively radially inwardly with respect to the blank as each successive tooth is formed at constantly decreasing radius and thereupon being returned to initiate the forming of the next successive tooth on the interrupted spiral path.

3. A single step method of making a thread cutting tap by forming threads thereon by removal of metal from the lead section of a blank having circumferentially spaced tapering lands, such method including effecting relative rotation of a blank and tool about the axis of the blank while relatively advancing the tool axially on predetermined pitch, and effecting relative radial movement between the tool and the blank in an interrupted spiral path, the removal of metal from successive lands starting precisely on said predetermined pitch and on said spiral path in a tooth-forming pass, and throughout such removal of metal from each land effecting relative movement between the tool and the blank radially inwardly toward the axis of the blank until the tool has completed a traverse of the respective land, and then effecting relative movement between the tool and the blank in a direction relatively radially outwardly from the axis of the blank between lands to restore the tool and blank to said path to initiate the removal of metal in a tooth forming operation on the next successive land beginning precisely on the said interrupted spiral path.

References Cited

UNITED STATES PATENTS

| | | | |
|---|---|---|---|
| 1,845,063 | 2/1932 | Trobjevich | 76—101 XR |
| 1,881,281 | 10/1932 | Lamond. | |
| 3,125,772 | 3/1964 | Beck | 10—141 XR |

GRANVILLE Y. CUSTER, JR., *Primary Examiner.*